Figure 1:
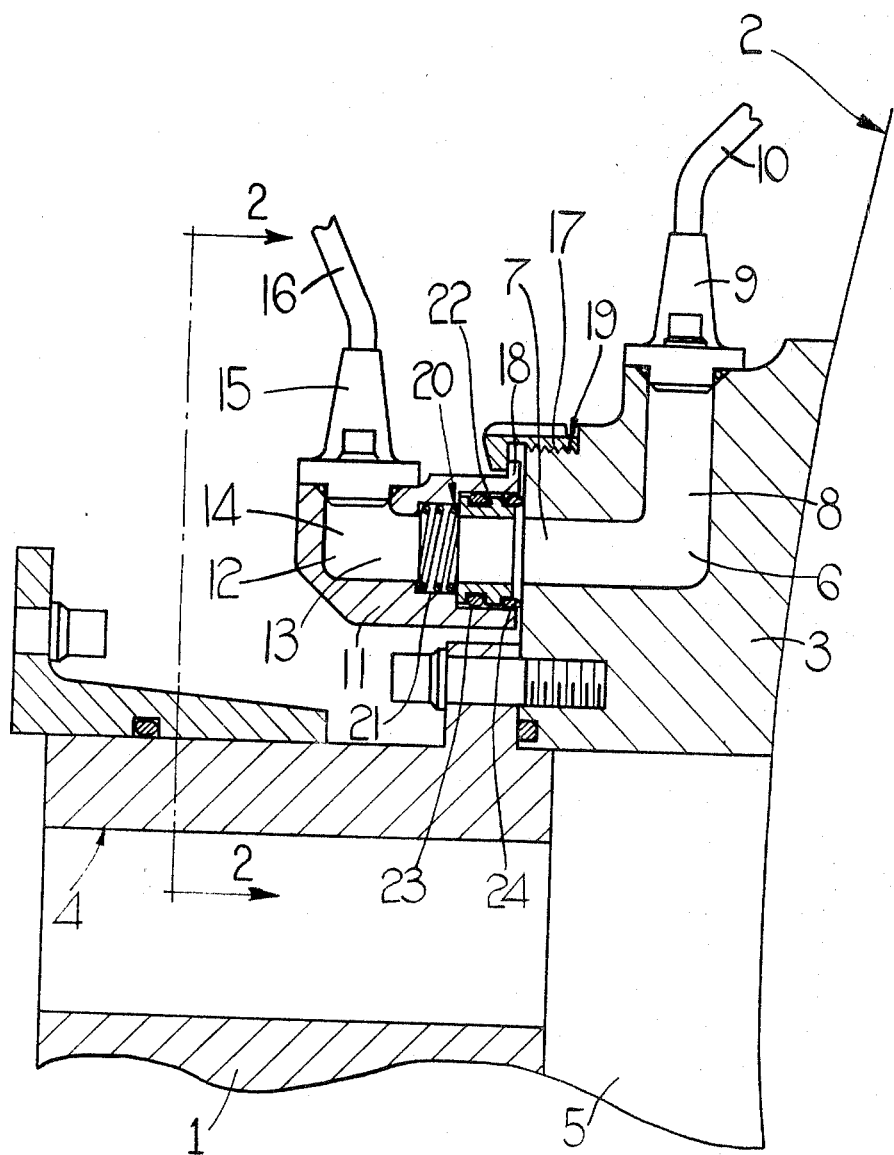

United States Patent [19]
Bottoms

[11] 3,841,670
[45] Oct. 15, 1974

[54] APPARATUS FOR CONNECTING PIPES TO AN AIRCRAFT ENGINE

[75] Inventor: Harry Simister Bottoms, Solihull, England

[73] Assignee: Joseph Lucas (Industries) Limited, Birmingham, England

[22] Filed: July 7, 1972

[21] Appl. No.: 269,888

[52] U.S. Cl. .............................. 285/101, 285/137 R
[51] Int. Cl. ............................................. F16l 39/00
[58] Field of Search........ 285/101, 137 R, 131, 132, 285/133 R; 60/39.31, 39.32

[56] References Cited
UNITED STATES PATENTS

| | | | |
|---|---|---|---|
| 2,438,679 | 3/1948 | Parker | 285/137 R |
| 2,672,187 | 3/1954 | Smith | 285/137 R X |
| 3,377,028 | 4/1968 | Bruggeman | 285/101 X |
| 3,551,005 | 4/1969 | Brun | 285/137 R X |

Primary Examiner—Thomas F. Callaghan
Attorney, Agent, or Firm—Holman & Stern

[57] ABSTRACT

The invention relates to apparatus for making a plurality of simultaneous pipe connections to an aircraft engine.

The apparatus comprises a mounting trunnion (1) for the engine (2), a first annular member (3) fixed to the trunnion (1) and having a plurality of through passages (6). A pipe (10) is connected to one end of each passage (6) and the other ends of the passages (6) are arranged on a pitch circle about the trunnion axis so as to be sealingly mated with an equal number of passages (12) in an annular member (11). Passages (12) communicate with pipes (16) and members (3) (11) are secured together by a clamping ring (17).

8 Claims, 2 Drawing Figures

APPARATUS FOR CONNECTING PIPES TO AN AIRCRAFT ENGINE

This invention relates to apparatus for making a plurality of simultaneous pipe connections to an aircraft engine.

An apparatus according to the invention comprises a mounting trunnion for the engine, a first annular member engaging the trunnion and including a plurality of first through passages, each said first passage having at one end a pipe sealingly attached thereto and having an open end lying on a pitch circle about the axis of the trunnion, a second annular member adapted to engage the first annular member and having a plurality of second through passages, each second passage having at one end a pipe sealingly attached thereto and being disposed so that its other end aligns, in use, with the open end of a corresponding first passage, means at the mating faces of the first and second passages and clamping means to urge the first and second annular members together.

Figure 2:
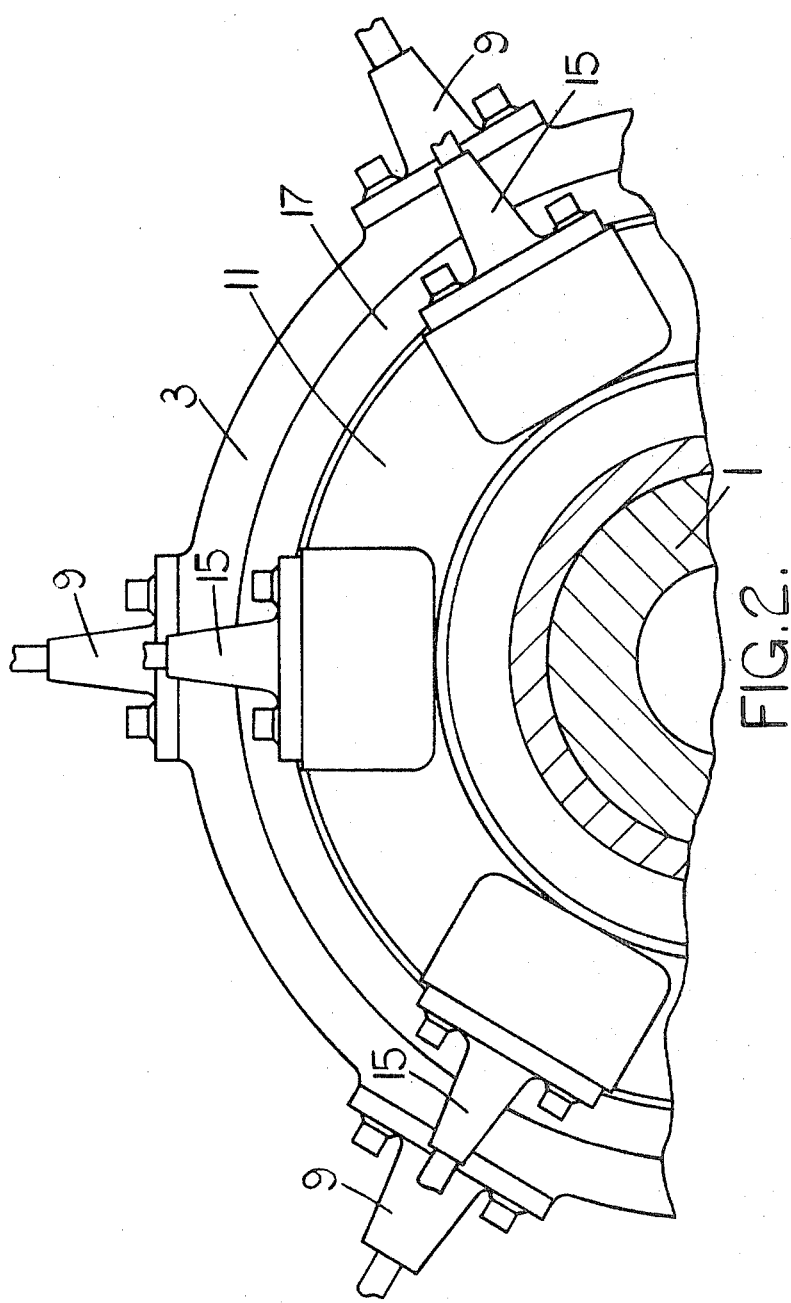

An apparatus in accordance with the invention will now be described by way of example and with reference to the accompanying drawings, in which FIG. 1 is a part section through the apparatus and FIG. 2 is a section on line 2—2 in FIG. 1. FIG. 1 shows a part-section of a trunnion 1 of an aircraft engine 2. A first annular member 3 is fixedly attached to the trunnion 1 and the engine 2. The trunnion 1 has a bore 4 extending its whole length and opening into a chamber 5 in the member 3. A pipe (not shown) extends between the chamber 5 and the engine 2. The member 3 has a plurality of L-shaped passages 6 the bores 7 of which are substantially equally spaced on a pitch circle about the axis of the member 3. The bores 8 of the passages 6 extend radially of the axis of the member 3 and have sealingly attached to them connections 9 for pipes 10.

A second annular member 11 also has a plurality of L-shaped passages 12 each bore 13 of which aligns with a corresponding bore 7 in the member 3. The bores 14 of the passages 12 extend radially of the axis of the member 11 and have sealingly attached to them connections 15 for pipes 16. A clamping ring 17 engages a flange 18 on the member 11 and threaded portion 19 on the member 3. Each bore 13 of the passages 12 in the member 11 has a stepped recess 20 containing a spring 21 and a piston-like member 22 slidable within the recess. Each piston-like member 22 has a first seal 23 engaging the wall of the recess 20 and a second seal 24 directed outwardly of the bore 13.

The pipes 10 are connected to apparatus (not shown) contained within the engine 2 and the pipes 16 are connected to external apparatus (not shown). The bore 4 of the trunnion 1 is also connected to an external apparatus.

In use the clamping ring 17 urges the member 11 towards the member 3. Each sealing ring 24 engages the mating face of the member 3 around a corresponding bore 7. The length of the thread 19 and the dimensions of the clamping ring 17 are such that when the clamping ring 17 butts against the end of the thread 19 the faces of the members 3, 11 are not in contact, the pistons 22 being moved by the springs 21 to urge the seals 24 into close contact with the member 3. Fluid flows between external apparatus and the engine 2 via the pipes 10, 16 and the passages 6, 12. Fluid pressure in the bores 13 acts in support of the springs 21 to increase the pressure on the seals 24. Fluid also flows between an external apparatus and the engine 2 via the bore 4 of the trunnion 1, the chamber 5 and a pipe (not shown).

I claim:

1. An apparatus for making a plurality of simultaneous pipe connections to an aircraft engine, comprising a mounting trunnion for the engine, a first annular member fixedly attached to the trunnion and the engine and including a plurality of first through passages, a plurality of pipes sealingly extending from one end of each of said first passages, said first passages having open ends lying on a pitch circle about the axis of the trunnion, a second annular member surrounding said trunnion and adapted to engage the first annular member and having a plurality of second through passages, a plurality of pipes sealingly extending from one end of each of said second passages, said second passages being disposed so that their other ends align, in use, with the open ends of corresponding first passages, sealing means at the mating faces of the first and second passages and clamping means to urge the first and second annular members together and to simultaneously connect the plurality of said first passages with the plurality of said second passages.

2. An apparatus as claimed in claim 1 in which the trunnion has a through bore which communicates with the engine via a chamber in the first annular member.

3. An apparatus as claimed in claim 1 in which the said first through passages are L-shaped and the said one end of each second passage extends radially of the axis of the second annular member.

4. An apparatus as claimed in claim 1 in which the said second through passages are L-shaped and the said one end of each second passage extends radially of the axis of the second annular member.

5. An apparatus as claimed in claim 1 in which the sealing means comprises a piston-like member each of which is slidable in a bore in each of the passages in one of the annular members, each said piston-like member including a seal directed outwardly of the said bore.

6. An apparatus as claimed in claim 5 in which each said piston-like member is biased outwardly of the said bore by a spring.

7. An apparatus as claimed by claim 1 in which the clamping means comprises a threaded ring respectively engageable with a flange on one annular member and with a threaded portion on the other annular member and with a threaded portion on the other annular member.

8. An apparatus as claimed in claim 7 in which the dimensions of the ring and the said threaded portion are such that when the ring is fully engaged with the threaded portion the adjacent faces of the first and second annular members are not in contact.

* * * * *